March 13, 1956 N. E. HART 2,738,184
WEIGHING SCALE HOUSING SUPPORT
Filed Aug. 30, 1952 2 Sheets-Sheet 1
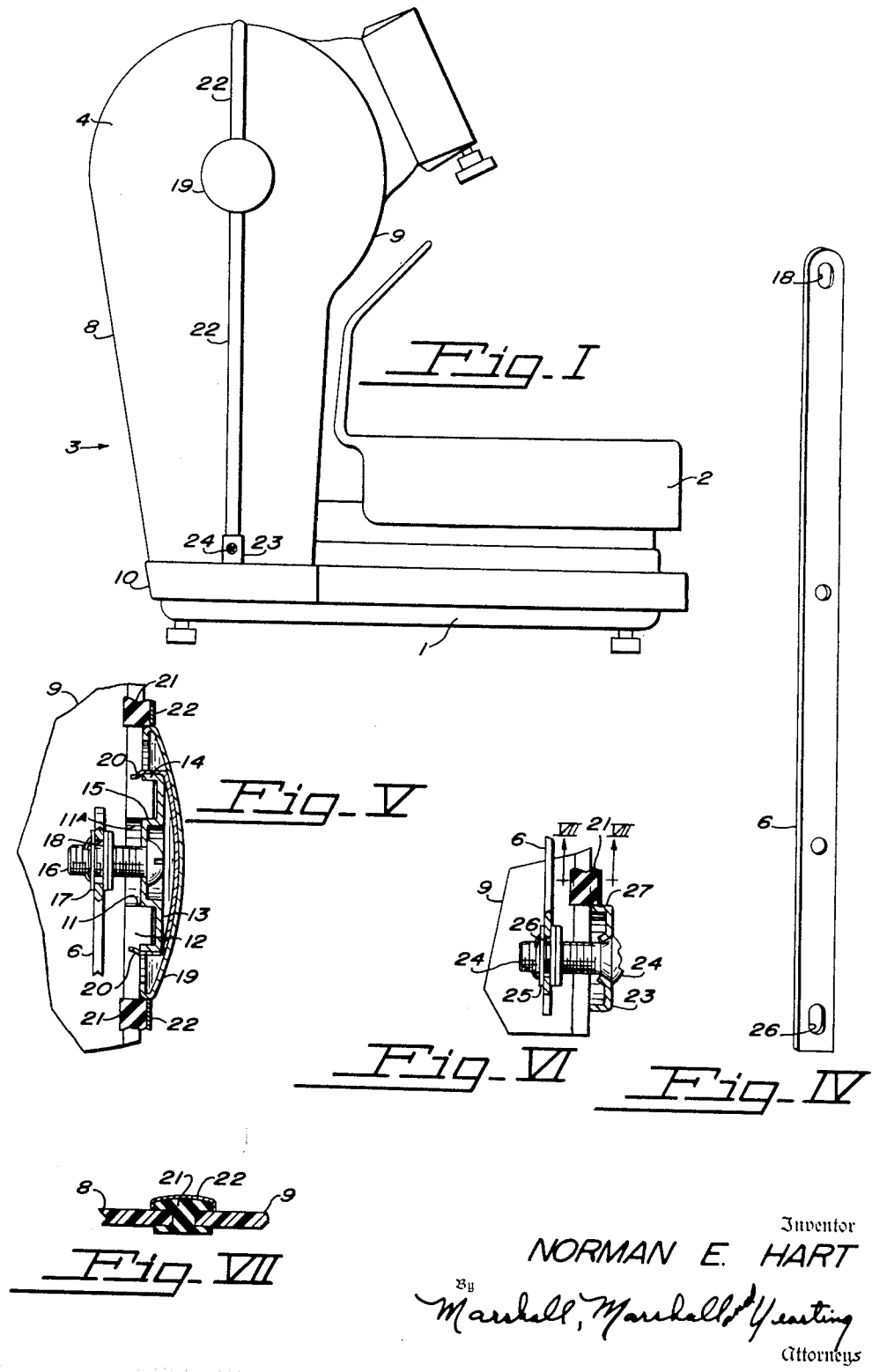
Inventor
NORMAN E. HART
By Marshall, Marshall & Yeasting
Attorneys

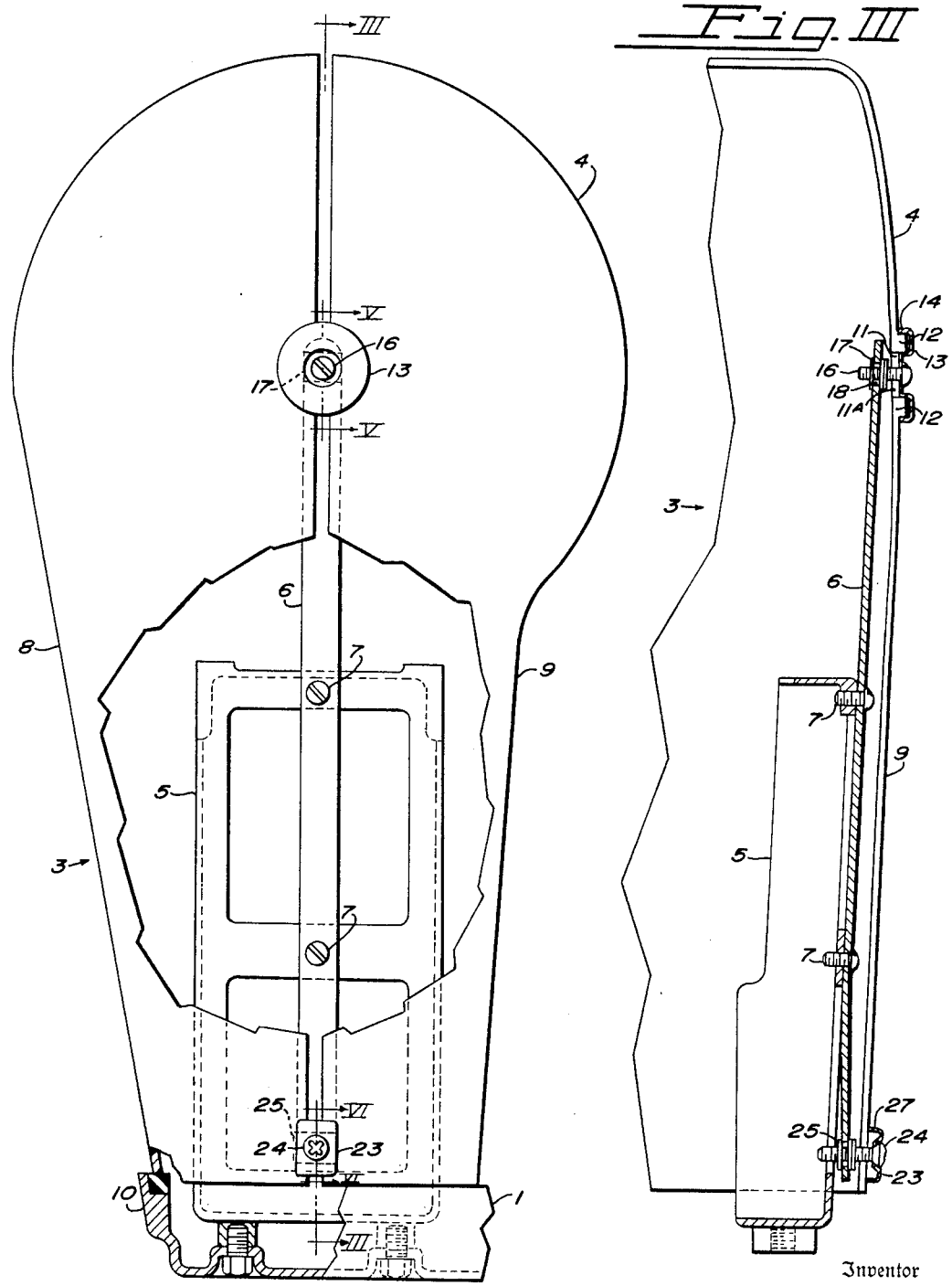

United States Patent Office 2,738,184
Patented Mar. 13, 1956

2,738,184

WEIGHING SCALE HOUSING SUPPORT

Norman E. Hart, Toledo, Ohio, assignor to Toledo Scale Company, Toledo, Ohio, a corporation of New Jersey Application August 30, 1952, Serial No. 307,184

3 Claims. (Cl. 265—27)

This invention relates to weighing scales of the type employed in the retailing of meat and grocery items, and in particular to improved means for mounting a housing on such a scale.

Weighing scales of the type embodying the instant invention generally comprise a base, a frame erected from the base which frame supports a portion of a weighing mechanism, and a housing covering the weighing mechanism and frame. The housing in most instances is made of sheet metal or plastic, and is usually attached to the frame supporting the weighing mechanism.

Difficulties are often experienced in mounting the housing on the scale. For example, if the housing is made of sheet metal, care must be taken in fastening the housing to the scale frame. By securing the housing too tightly, the weighing mechanism may be distorted enough to give inaccurate readings. If a plastic housing is used to cover the weighing mechanism, fastening this housing on the scale frame too tightly may cause the housing to crack and may also distort the weighing mechanism. Rigid attachment of either type of housing, plastic or metal, also has other disadvantages. One of these is that the housing and weighing mechanism are subject to distortion if either a merchant or his customers unintentionally leans against the scale housing. Since the housing is generally attached to the frame supporting the weighing mechanism, leaning upon the rigidly attached housing may affect the adjustment of the frame, and consequently affect the adjustment of the weighing mechanism. Another disadvantage is the possibility of straining the weighing mechanism during shipment because of the rigid manner in which the housing is attached to the frame.

The principal object of this invention is to provide new and improved means for attaching a weighing scale housing to a scale frame whereby the housing may be fastened to the frame without affecting the adjustment of the scale.

Another object of the invention is to provide a weighing scale housing which is resiliently attached to the scale frame.

Still another object is to provide on a scale frame one or more flexible strips to which is attached the weighing scale housing.

A further object is to provide improved means for attaching a plastic weighing scale housing to flexible means mounted on a scale frame whereby the plastic housing will not be cracked or otherwise damaged should the housing be fastened too tightly.

Other objects and advantages will be apparent from the following description in which reference is had to the accompanying drawings.

According to the invention, a frame which supports the weighing mechanism of a weighing scale mounts at each end a substantially vertical flexible strip. The strips are attached to the frame near their centers leaving their upper and lower ends free to flex. A pair of shells constitute a portion of the housing which covers that part of the weighing scale in which is located the frame to which the flexible strips are attached. When assembled, the shells are placed substantially together with the parting line at the ends of the shells parallel to the flexible strips. A pair of clips at each end of the housing fasten the housing, by means of screws and self-locking nuts, to the flexible strips at the lower and upper ends of the strips, thereby providing a resilient connection between the housing and the scale frame.

In the drawings:

Figure I is a left side view in elevation of a weighing scale embodying the invention.

Figure II is an enlarged view in elevation substantially similar in part to Figure I, illustrating the means for attaching the shells to the flexible strips fixed to the frame, parts being broken away, and other parts being shown in section.

Figure III is an elevational view taken substantially along line III—III of Figure II.

Figure IV is a view in perspective of a flexible strip of the type employed in the instant invention.

Figure V is an enlarged fragmentary view taken substantially along line V—V of Figure II and includes also a medallion shown in Figure I, parts being shown in section.

Figure VI is a fragmentary view enlarged to the same extent as Figure V taken substantially along line VI—VI of Figure II, parts being shown in section.

Figure VII is a fragmentary view in section of the H-shaped molding interposed between the shells of the housing, and is taken substantially along line VII—VII of Figure VI.

A weighing scale embodying my invention comprises a base 1 above which lies a load receiver or platter 2 supported by weighing mechanism (not shown) mounted on the base. An upright housing 3 surmounts the base at the rear of the scale and includes an upper generally cylindrical portion 4. A weighing scale frame located within the housing 3 and mounted on the base 1 supports automatic load counterbalancing mechanism (not shown) which is operatively connected to and drives a rotatable cylindrical chart (not shown) housed within the cylindrical portion 4 of the housing 3. The weighing scale frame includes upright portions 5 of the frame at each end of the housing 3. A flexible strip 6 is vertically mounted on the outer side of each of the portions 5 of the frame and is attached near its center by a plurality of screws 7 threaded into the portions 5. The upper ends of the strips extend a short distance above the upper points of attachment while the lower ends extend a substantial distance below the lower points of attachment of the strips to the frame portions 5. The housing 3 is formed of a rear shell 8 and a front shell 9 which enclose the weighing scale frame, the load counterbalancing mechanism and the cylindrical chart.

When the shells 8 and 9 are in their assembled positions, the bottom edges of the shells rest on a flat rubber molding which runs around a ledge formed on the inner edge of an upturned rim 10 of the base 1. Each end of the shells 8 and 9 has at its upper portion adjacent the parting line a semi-cylindrical notch 11 (see Figure V) which, when the shells are placed together, forms a circular opening 11a concentric with a center located on the parting line.

Outwardly directed bosses 12 are formed integrally with the shells 8 and 9 concentric with the notches 11, thereby forming cylindrical bosses around the openings 11a formed by the notches. A washer or clip 13 at each end of the housing is adapted to hold the shells 8 and 9 from longitudinal or lateral movement with respect to the parting line by having a flange 14 formed on the clip, which flange surrounds the bosses 12. The clips 13 are also provided with cylindrical portions 15 extending in the same direction as the flanges. When the clips have their flanges engaged around the bosses 12, they also have their cylindrical portions 15 extending into the openings 11a. Screws 16 hold the clips 13 to the flexible strips 6 by means of U-shaped self-locking nuts 17 which engage around the strips 6 with their threaded openings aligned with elongated slots 18 at the upper ends of the flexible strips 6. The provision of the elongated slots greatly facilitates assembly of the several parts. As shown in Figure V, medallions 19 engage over the clips 13, being removably retained in place by means of spring clips 20 which engage around those portions of the flanges 14 adjacent the parting line. The spring clips 20 are fastened to the medallions 19.

Abutting the upper and lower sides of the medallions along the parting line and interposed between the shells 8 and 9, are various lengths of strips of H-shaped rubber molding 21 (shown in section in Figure VII). The H-shaped molding 21 has fixed to its outer edge a thin metallic covering 22 which presents a pleasing exterior appearance for the molding along the parting line between the shells 8 and 9. It also acts to provide a somewhat flexible joint between the shells along the parting line.

Referring to Figure VI, which illustrates the means by which the shells 8 and 9 are attached to the flexible strips 6 at the lower ends of the strips, substantially rectangular washers or clips 23 are countersunk to receive oval headed screws 24. The screws 24 engage with U-shaped self-locking nuts 25 which are similar to the U-shaped self-locking nuts 17 attached to the flexible strips 6. Elongated slots 26 at the lower ends of the strips 6 through which the screws 24 pass are provided as at the opposite ends of the flexible strips 6. The rectangular clips 23 have flanges 27 which engage with the shells 8 and 9 adjacent the parting line.

While the flexible strips preferably are employed at each end of the scale, one of the described flexible strips performs somewhat satisfactorily if employed at one end only. The problem of assembling the housing on the scale without distorting the frame may be solved with the single strip, but the problem of minimizing damage that may occur in shipping or when persons or objects lean upon the scale will be solved only partially.

Having described the invention, I claim:

1. In a weighing scale housing, in combination, a pair of shells meeting along a parting line and constituting a portion of the weighing scale housing, a frame located behind the parting line of the shells, a flexible strip that is attached to each end of the frame and that extends along the parting line of the shells behind the parting line, the upper and lower ends of the strips being free to flex, and fastening means for securing the shells to the free ends of the flexible strips, whereby all of the connections between the shells and the frame are resilient connections.

2. In a weighing scale housing, in combination, a pair of shells meeting along a parting line and constituting a portion of the weighing scale housing, a frame located behind the parting line of the shells, a flexible strip that is attached to each end of the frame and that extends along the parting line of the shells behind the parting line, the upper and lower ends of the strips being free to flex, and fastening means adapted to hold the shells from longitudinal or lateral movement with respect to the parting line for securing the shells to the strips.

3. In a weighing scale housing, in combination, a pair of shells meeting along a parting line and constituting a portion of the weighing scale housing, a frame located behind the parting line of the shells, a substantially vertical flexible strip attached to each end of the frame, the upper and lower ends of the strips being free to flex, fastening means adapted to hold the shells from longitudinal or lateral movement with respect to the parting line for securing the shells to the upper ends of the strips, and means for securing the shells to the lower ends of the strips.

References Cited in the file of this patent

UNITED STATES PATENTS

| | | |
|---|---|---|
| 325,033 | Wetmore | Aug. 25, 1885 |
| 429,660 | Sullivan | June 10, 1890 |
| 1,584,109 | Ludlow | May 11, 1926 |
| 1,766,597 | Bushnell | June 24, 1930 |
| 1,957,933 | Brandl | May 8, 1934 |
| 2,426,800 | Triplett | Sept. 2, 1947 |
| 2,437,717 | Werner | Mar. 16, 1948 |
| 2,565,431 | Karp | Aug. 21, 1951 |
| 2,659,590 | Little | Nov. 17, 1953 |